United States Patent [19]

Diaz et al.

[11] 4,209,352
[45] Jun. 24, 1980

[54] METHODS FOR SEALING CLOSURE MEMBERS TO SUBSTRATES

[75] Inventors: Stephen H. Diaz, Los Altos Hills; David A. Horsma, Palo Alto, both of Calif.

[73] Assignee: Raychem Corporation, Menlo Park, Calif.

[21] Appl. No.: 934,715

[22] Filed: Aug. 21, 1978

[51] Int. Cl.$^2$ ............................................... H01R 3/00
[52] U.S. Cl. ...................................... 156/49; 156/213; 156/227; 156/285; 174/84 R; 174/92
[58] Field of Search ............ 156/49, 196, 158, 212–313, 285, 293, 294; 174/76, 84 R, 88 R, 92, 93, 138 F; 285/292, 293, 294, 297, 284, 97; 264/314; 249/65, 128/DIG. 20

[56] References Cited

U.S. PATENT DOCUMENTS

| | | | |
|---|---|---|---|
| 1,756,080 | 4/1930 | Austin | 174/15 BH |
| 1,775,776 | 9/1930 | Ober et al. | 174/84 R |
| 2,050,888 | 8/1936 | Kirch | 174/11 R |
| 2,142,884 | 1/1939 | Chaplin | 174/21 R |
| 2,255,832 | 9/1941 | Thompson | 174/12 R |
| 2,407,528 | 9/1946 | Antonson | 156/285 X |
| 2,582,064 | 1/1952 | Phillips | 174/22 R |
| 2,740,825 | 4/1956 | Rifenburl | 174/23 R |
| 3,120,846 | 2/1964 | Fletcher | 128/DIG. 20 |
| 3,153,413 | 10/1964 | Gottfried | 128/DIG. 20 |
| 3,175,032 | 3/1965 | Strauss | 174/93 |
| 3,339,011 | 8/1967 | Ewens et al. | 174/92 |
| 3,419,669 | 12/1968 | Dienes | 174/76 X |
| 3,427,392 | 2/1969 | Plummer | 174/138 F X |
| 3,447,986 | 6/1969 | Kasahara | 174/92 |
| 3,484,541 | 12/1969 | Campbell | 174/138 |
| 3,553,970 | 1/1971 | Wiswell | 264/314 X |
| 3,557,298 | 1/1977 | Thompson et al. | 174/88 R X |
| 3,619,481 | 11/1971 | Smith | 174/76 X |
| 3,652,777 | 3/1972 | Elliott | 174/11 R |
| 3,770,871 | 11/1973 | Goodman | 174/11 R |
| 3,876,820 | 4/1975 | Mashikian | 174/19 |
| 3,879,574 | 4/1975 | Filreis et al. | 174/76 |
| 3,896,260 | 7/1975 | Plummer | 174/76 X |
| 4,016,356 | 4/1977 | McLoughlin | 174/84 R X |

Primary Examiner—David A. Simmons
Attorney, Agent, or Firm—Lyon & Lyon

[57] ABSTRACT

Novel methods for sealing a closure member to a substrate make use of pressure generated in a chamber to create and/or maintain a seal between a closure member and a substrate. The chamber has a flexible wall which is urged towards the substrate by the pressure. Where the substrate has a hollow interior which is maintained at superatmospheric pressure, e.g. a pressurized telephone cable, a fluid passage is preferably provided between the interior and the closed chamber after the seal has been formed, thus taking the closure member out of peel with the substrate. A preferred closure member is an inflatable bag which has sealing material on selected portions of one surface thereof, so that it can be wrapped around the substrate to form a hollow enclosure around the substrate. After placing a restraining means around the wrapped closure member, the closure member is inflated, thus improving the seal around the enclosure.

39 Claims, 7 Drawing Figures

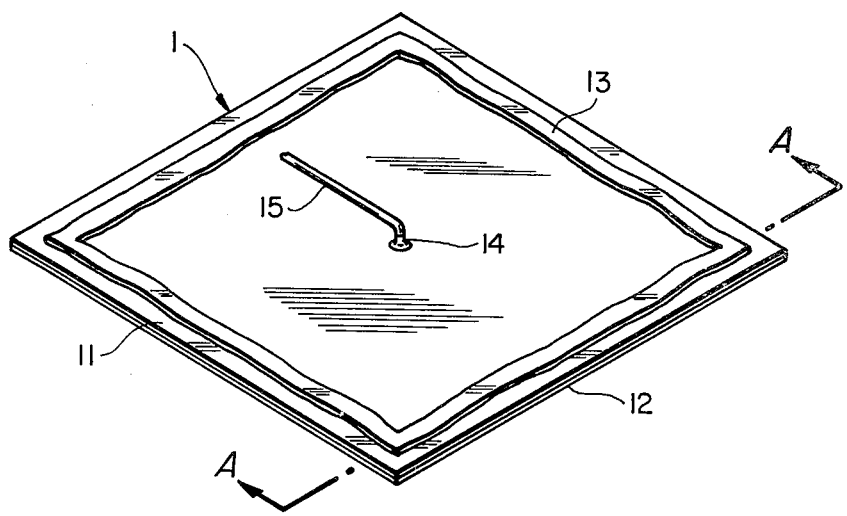
FIG__1
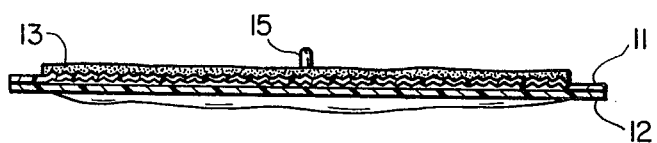
FIG__2
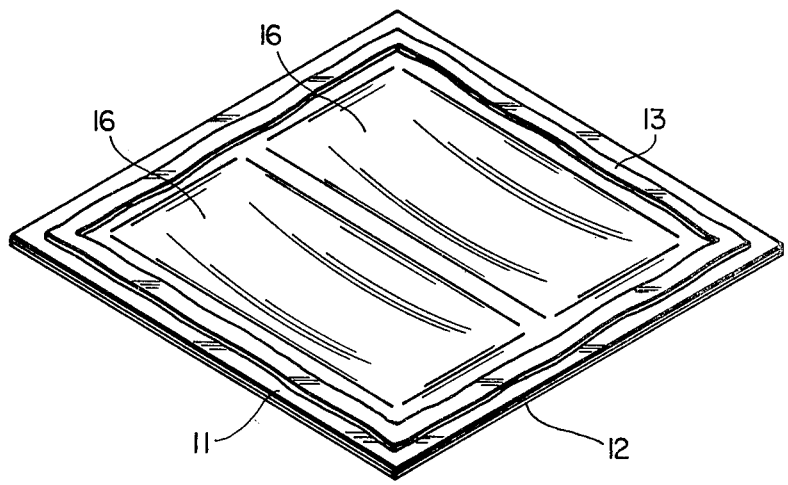
FIG__3

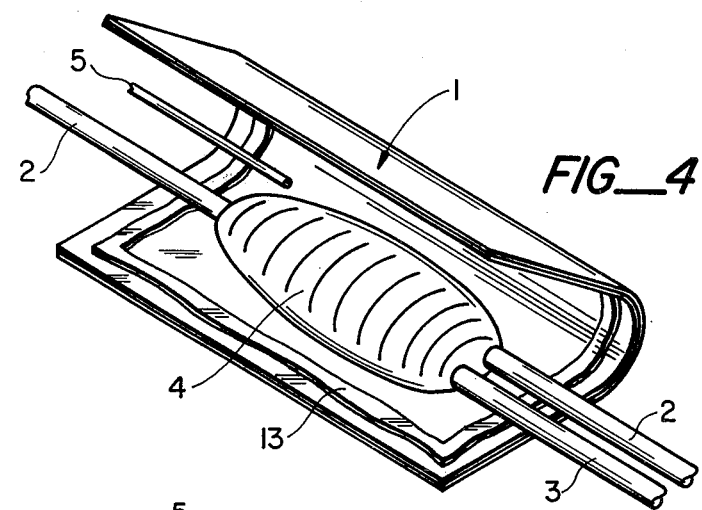
FIG_4
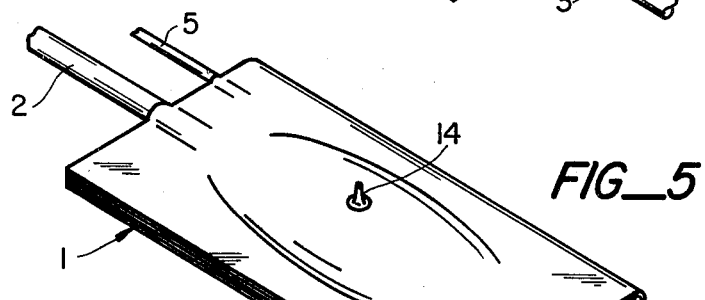
FIG_5
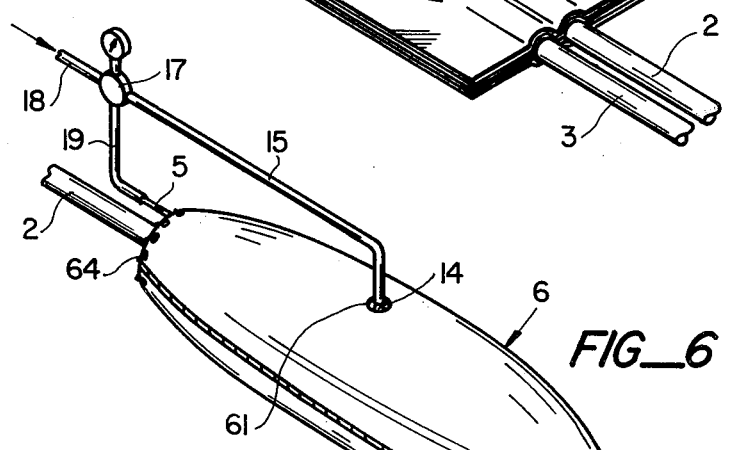
FIG_6
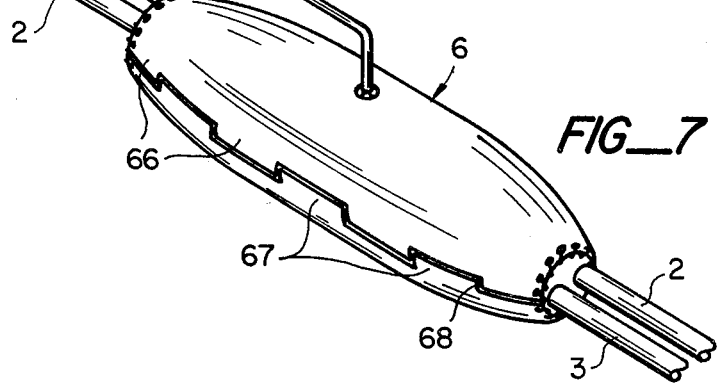
FIG_7

METHODS FOR SEALING CLOSURE MEMBERS TO SUBSTRATES

BACKGROUND OF THE INVENTION

1. Field of the Invention

This invention relates to methods for sealing a closure member around a substrate, and to closure members suitable for use in such methods. The invention is particular useful for forming closures around conduits, especially joints between conduits, e.g. splices in telephone cables.

2. Summary of the Prior Art

Many methods are known for sealing a closure member around a substrate. Often, there is difficulty in ensuring adequate conformance of the closure member to the substrate, because the substrate has an irregular surface and/or because the closure member must seal around two or more substrates, for example when an enclosure is to be formed around a "one-in, two-out" cable splice. To overcome this difficulty, it is well known to use closure members which are heat-shrinkable or elastomeric; it has also been proposed to use inflatable closure members, but these have not gained commercial acceptance. The difficulty of obtaining a satisfactory seal is particularly acute when the substrate, after being covered, is maintained under superatmospheric pressure, e.g. a splice in a pressurised telephone cable.

SUMMARY OF THE INVENTION

Our invention relates to novel methods for sealing a closure member around a substrate, and novel closure members and closure systems which are suitable for use in such methods.

In its first aspect, the invention provides a method for sealing a closure member to a substrate which comprises (1) providing an assembly comprising
  (a) a substrate;
  (b) an inflatable closure member wrapped around the substrate so that parts of the closure member overlap, the parts of the closure member adjacent the substrate being flexible;
  (c) sealing material between the closure member and the substrate and between overlapping parts of the closure member which are adjacent the substrate; and
  (d) restraining means placed around the inflatable closure member; and
(2) inflating the inflatable closure member so that it is pressed against the restraining means and against the substrate;

thereby creating a seal between the substrate and the closure member.

In its second aspect, the invention provides an inflatable closure member which is suitable for use in the above method and which comprises
  (a) wall members which are at least in part flexible and which define an inflatable enclosure; and
  (b) sealing material coated on selected portions of said wall members, said portions being flexible;

the closure member being so constructed and arranged that it can be wrapped around a substrate so that parts of the member overlap and so that there is sealing material between the closure member and the substrate and between overlapping parts of the closure member, whereby after surrounding the wrapped closure member with a restraining means, inflation of the closure member causes it to be pressed against the restraining means and against the substrate with sealing material therebetween and thus to create a seal between the substrate and the closure member.

In its third aspect the invention provides a closure system which comprises an inflatable closure member as defined above and a restraining means which can be placed around the wrapped closure member.

In its fourth aspect the invention provides a method of sealing a flexible closure member to a hollow substrate whose interior is maintained at, or may be subject to, superatmospheric pressure, which method comprises providing a fluid passageway between the interior of the substrate and a closed chamber having a flexible wall through which the pressure in the chamber is transmitted to the seal between the closure member and the substrate and urges the closure member towards the substrate in the area of the seal.

BRIEF DESCRIPTION OF THE DRAWINGS

The invention is illustrated in the accompanying drawings, in which:

FIG. 1 is an isometric view of an inflatable closure member of the invention, in a deflated condition;

FIG. 2 is a cross-sectional view along the line A—A of the closure member of FIG. 1;

FIG. 3 is a cross-sectional view of another inflatable closure member of the invention;

FIGS. 4-7 shows successive steps in the process of the invention when used to enclose a "one-in two-out" splice in a pressurised telephone cable.

DETAILED DESCRIPTION OF THE INVENTION

This invention is useful for sealing a closure member to a wide variety of substrates, especially conduits, i.e. elongate substrates down which a fluid or some form of energy, e.g. electricity or light, which may be in the form of a signal, can flow. The invention is particularly useful for substrates which are hollow and whose interior is maintained at, or may be subject to, superatmospheric pressure, for example pressurised telephone cables. The closure member may form an enclosure around a short length of an elongate substrate, e.g. to cover a damaged area of insulation on a cable or to enclose a joint between conduits, or it can form a member which extends outwardly from the substrate and which is sealed, at any suitable stage, to another body.

The closure members used in this invention are preferably inflatable and of the wrap-around type, and the invention will chiefly be described by reference to such closure members. It is to be understood, however, that the invention includes the use of closure members which are not of the wrap-around type (i.e. which require the substrate to have a free end) and the use of non-inflatable closure members which cooperate with one or more inflatable chambers which have flexible walls, to create a seal between the substrate and the closure member. The term "inflatable closure member" is used herein to include any closure member which comprises a wall member one side of which becomes sealed to the substrate and the other side of which forms part of an inflatable enclosure. Preferably the closure member is inflatable in the absence of the substrate, but the invention includes the use of closure members which become inflatable only when they have been wrapped around the substrate. It is preferred that the closure member should comprise only one inflatable enclosure, but it can comprise two or more inflatable enclosures, for example one at each end of the closure member.

The parts of the closure member adjacent the substrate must be sufficiently flexible to ensure adequate conformance to the substrate, and although it is possible for the closure member to include relatively rigid portions, providing that it can still be placed around and conform to the substrate, it is preferred that substantially the whole of the closure member should be flexible. Preferably the closure member will undergo non-recoverable deformation when pressed against and around the substrate; such deformation can be achieved by a suitable choice of material for the member and/or by corrugating those parts of the member which are adjacent the substrate, the corrugations preferably being parallel to the axis of the substrate.

The closure member can suitably be made of a flexible organic polymeric material; such material can readily be fabricated into an inflatable enclosure of desired shape by known techniques, e.g. heat sealing. The closure member is preferably transparent. We have obtained excellent results using closure members made by heat-sealing together sheets of a polyether-urethane, but those skilled in the art will recognise that a wide variety of other polymers will be satisfactory, including laminated sheets comprising two or more different polymers. The sheets may be fabric-reinforced and may be, for example, 10 to 20 mil thick. The closure member is preferably a closed bag formed by joining together two or more sheets of flexible organic polymeric material. The simplest of such bags is defined by first and second major wall members, the bag preferably having (when inflated) one substantially planar surface and one convex surface, the planar surface being placed adjacent the substrate. When a bulky substrate is to be enclosed, e.g. a large cable splice, it may be advantageous to use a bag which comprises first and second major wall members, each of which has a pair of parallel troughs formed in it and which nest together and are sealed along the edges, e.g. as shown in FIG. 4. The troughs thus provide a preformed enclosure around the substrate when the member is folded along a center line between the troughs.

The closure member must be inflatable (i.e. deflated or at most partially inflated) when it is first placed around the substrate, and the member must therefore comprise means for inflating it. Generally this will be a port, for example a valve, through which gas or other fluid can be passed to inflate the member. The port must of course be accessible when the closure member is in its wrapped position, and can be placed on the exterior of the closure member or (and often this is more convenient) on the interior of the closure member with a pipe attached thereto, which pipe is arranged so that it sticks out of one side of the wrapped closure member. The closure member may also comprise, on the inner surface thereof which is adjacent the substrate, a one-way valve which will permit gas above a certain pressure to pass from the substrate into the closure member, thus providing a safety measure against sudden increases in the pressure in the substrate which might otherwise disrupt the seal. The inner surface of closure member may also comprise a port which can be opened permanently after the seal has been formed, and thus provide a fluid passageway between the substrate and the closure member.

The invention also includes closure members which have internal inflation means which can be activated after the closure member has been placed around the substrate. The fluid which is passed into, or generated within, the closure member can be (but preferably is not) one which will substantially increase in viscosity, e.g. to a solid, after it has effected inflation.

Sealing material must be provided between the substrate and the closure member, and between adjacent overlapping parts of the closure member, and it will generally be convenient for at least part of this sealing material to be pre-coated onto the closure member. Additional sealing material may be placed around the substrate. The whole of the seal between overlapping parts of the closure member is preferably made with the aid of sealing material, but the invention includes the possibility that some of the seal between overlapping parts of the closure member is made by other means, e.g. by heat-sealing, which cannot conveniently be used around and adjacent to the substrate. In many situations it is desirable that the closure member should create a hollow sealed enclosure around a part of the substrate, and for this purpose sealing material should be provided between the substrate and marginal portions of the closure member which run transverse to the substrate; an area between the transverse marginal portions should be free from sealing material; and the overlapping marginal portions of the closure member which run lengthwise of the substrate should be sealed together. Thus the closure member in such situations is preferably a closed bag as described above having sealing material pre-coated on the transverse and lengthwise marginal portions of the surface of the bag which is placed adjacent the substrate.

The sealing material used is preferably one which will flow under pressure at room temperature, for example a pressure-sensitive mastic. Using such sealing material, the closure member can be wrapped around the substrate and manually pressed into position so that a complete, or nearly complete, seal is formed between substrate and closure member; inflation of the closure member improves and/or completes the seal. One advantage of using such sealing material is that the closure member can be easily removed by deflating the closure member and unwrapping it; re-enterability is important in a number of applications. When such sealing material is pre-coated onto the closure member, it will usually be covered with a protective release paper for storage purposes. Particularly when re-enterability is not required, other sealing materials can be used, for example hot-melt adhesives or adhesives which are cured in situ. Different sealing materials can be used at different points in the assembly.

The restraining means is preferably separable from the closure member, though the invention includes the possibility that the restraining means and the inflatable closure member form a single article. The restraining means is suitably composed of woven cloth, for example a piece of woven cloth, e.g. nylon cloth, which can be wrapped around the wrapped closure member and secured in generally sausage-shaped configuration by longitudinal securing means which keep the wrapped edges of the cloth together (e.g. a rod which passes through loops formed in the edges, or a heavy-duty zipper) and marginal diameter reduction means which can be used to draw the ends of the cloth down to the substrate (e.g. drawstrings which pass through eyelets or loops in the marginal portions of the piece of cloth).

The restraining means should of course be sufficiently strong to withstand the pressure exerted on it when the closure member is inflated, and should envelop the closure member to an extent such that the closure member remains confined when it is inflated. The restraining means may have a hole in it through which protrudes a valve for inflating the closure member.

The pressure to which the enclosure is inflated will generally be at least 1 psig, preferably at least 2 psig, e.g. 2 to 10 psig, to ensure adequate seal formation. The maximum pressure that can be used depends mainly upon the restraint and when using cloth restraining means will not generally exceed 50 psig. When the substrate to be covered is compressible, care must be taken to ensure that inflation of the closure member does not result in damage to the substrate. In some cases, for example when the substrate is a telephone cable splice, inflation of the bag can be useful in causing a desired degree of permanent reduction in the volume occupied by the plurality of joints making up the splice, e.g. a reduction of at least 5%, preferably 5 to 20%.

An important feature of the present invention is the realisation that when the substrate has a hollow interior which is maintained at (or may be subject to) superatmospheric pressure, it is possible to ensure that a closure member sealed to the substrate is never placed in peel if the closure member comprises, or has adjacent thereto, a closed chamber which presses the sealing part of the closure member against the substrate and which is in fluid communication with the interior of the substrate. When using an inflatable closure member which is wrapped around a pressurised substrate and which forms a hollow enclosure around a part of the substrate, there is preferably provided a pipe which extends into the hollow enclosure and through the seal between overlapping parts of the closure member out to the exterior. Without such a pipe it is difficult or impossible to build up the pressure differential between interior of the inflatable closure member and the hollow enclosure which is necessary to ensure satisfactory seal formation. It is often convenient to connect the inlet port of the closure member, the exit conduit from the hollow enclosure, and a source of gas supply, to a pressure differential control device which will ensure that the closure member is maintained at a pressure of about 3 psi, e.g. 2 to 4 psi, above the pressure inside the enclosure until satisfactory seals have been formed. Thereafter the inlet port of the closure member and the exit conduit from the sealed hollow enclosure can be connected to each other.

Referring now to the drawings, FIGS. 1 and 2 show an inflatable closure member (1) which is in the form of a bag comprising flexible polymeric sheet members 11 and 12 which are heat-sealed together at the edges. The top sheet member 11 is planar and marginal portions thereof, inboard of the heat-sealed area, have a pressure-sensitive mastic 13 coated thereon. The portions of sheet member 11 which are covered by mastic 13 are corrugated, as shown in FIG. 2. Lower sheet member 12 has a convex shape when the closure member is inflated. Valve 14 communicating with the interior of the closure member is fixed to sheet member 11, and flexible pipe 15 is fixed to valve 14.

FIG. 3 shows another inflatable closure member similar to that shown in FIGS. 1 and 2 except that flexible sheet members 11 and 12 each have a pair of parallel troughs 16 formed therein, so that when the member is folded about the centre line between the troughs, the member 11 provides a generally cylindrical enclosure. The planar part of sheet member 11 provides a planar wall member whose marginal portions have a coating thereon of sealing material 13.

FIG. 4 shows a closure member 1 similar to FIGS. 1 and 2, but having valve 14 in the lower sheet member 12, being wrapped around a "two-in, one-out" splice 4 in a pressurised telephone cable, branch cable 3 being spliced into main cable 2. Pipe 5 is placed so that it will provide a passageway for air trapped within the fully wrapped closure member.

FIG. 5 shows the closure member 1 after it has been fully wrapped around cables 2 and 3 and pipe 5 and pressed manually around them and against itself, thus forming a hollow sealed enclosure around the splice 4, with valve 14 communicating with said enclosure.

FIG. 6 shows restraining means 6 which has been secured in place around closure member 1. The longitudinal edges of restraining means 6 are secured together by means of zipper 62. The transverse edges of restraining means 6 have a plurality of eyelets 65 formed therein, through which are passed drawstrings which cause the ends of the restraining means to adopt a desired shape. Underlying the drawstrings are cloth skirts to distribute the pressure evenly over the closure member. Valve 14 of closure member 1 protrudes through hole 61 in the restraining means, and is connected via tube 15 to pressure control device 17. Also connected to device 17 are an air supply (not shown) via tube 18 and pipe 5 via tube 19. Device 17 ensures that the pressure in the closure member is maintained about 3 psi higher than the pressure within the sealed hollow enclosure around the splice 4.

FIG. 7 shows the final configuration of a splice case as shown in the course of preparation in FIGS. 4, 5 and 6, except that it illustrates an alternative method of securing together the longitudinal edges of the restraining means by means of loops 66 and 67 formed in the edges and a rod 68 passed through the loops. When the closure member has been maintained for a sufficient time at a pressure greater than the pressure in the sealed enclosure around the splice, the air supply and the device 17 are removed, and tubes 15 and 19 are connected directly to each other.

We claim:

1. A method for enclosing a splice comprising at least two cables and a joint therebetween, comprising the steps of:
    (a) wrapping an inflatable closure member having sealing material pre-coated on selected portions thereof around the splice so that parts of the closure member overlap, the parts of the closure member adjacent the cables being flexible, the closure member being so constructed and wrapped that there is sealing material between the closure member and the cables and between overlapping parts of the closure member which are adjacent the cables;
    (b) placing restraining means around the inflatable closure member; and
    (c) inflating the inflatable closure member so that it is pressed against the cables with sealing material therebetween, thereby creating a continuous seal between the cables and the closure member.

2. A method according to claim 1 wherein the parts of the closure member which form a continuous seal around the cables are corrugated.

3. A method according to claim 1 wherein said restraining means is separable from said closure member.

4. A method according to claim 1 wherein the closure member is in the form of a closed bag having a port therein through which gas can be passed to inflate the bag, and the bag is inflated by passing gas through said port.

5. A method according to claim 4 wherein there is sealing material between the cables and marginal portions of the bag which run transverse to the splice and between overlapping marginal portions of the bag which run transverse of the splice; wherein an area between said transverse marginal portions is free from sealing material; and wherein the overlapping marginal portions of the bag which run lengthwise of the splice are sealed to each other; thereby creating a hollow sealed enclosure around a part of the splice.

6. A method according to claim 5 wherein said lengthwise overlapping marginal portions of the bag are sealed to each other by means of sealing material.

7. A method according to claim 6 wherein at least part of the sealing material is pre-coated onto said transverse and lengthwise portions of the bag.

8. A method according to claim 7 wherein said transverse portions of the bag are corrugated.

9. A method according to claim 7 wherein each of the cables comprises at least one electrical conductor, and the joint is between an electrical conductor from one cable and an electrical conductor from another cable.

10. A method according to claim 7 wherein said substrate comprises at least two cables, each of which cables comprises at least one signal-carrying conduit, and at least one joint between a signal-carrying conduit from one cable and a signal-carrying conduit from another cable.

11. A method according to claim 10 wherein said cables are telephone cables and there are a plurality of said joints.

12. A method according to claim 11 wherein inflation of the closed bag closure member causes a permanent reduction in the volume occupied by said plurality of joints.

13. A method according to claim 11 wherein said telephone cables are pressurised telephone cables.

14. A method according to claim 13 wherein said assembly includes a conduit which permits gas trapped within said hollow sealed enclosure to escape therefrom.

15. A method according to claim 14 wherein the closed bag is inflated to a pressure which is at least 2 psi greater than the pressure within said hollow sealed enclosure.

16. A method according to claim 15 wherein, after said continuous seal has been created, said conduit is connected to said port in said bag, whereby the pressures within said bag and said hollow sealed enclosure are maintained equal.

17. A method according to claim 4 wherein said closed bag closure member is constructed of flexible organic polymeric transparent material.

18. A method according to claim 4 wherein said restraining means is separable from said closed bag.

19. A method according to claim 18 wherein said restraining means is composed of a woven cloth.

20. A method according to claim 5 wherein the closed bag is inflated to a pressure greater than the pressure within the hollow sealed enclosure.

21. A method according to claim 20 wherein the closed bag is inflated to a pressure at least 2 psi greater than the pressure within the hollow sealed enclosure.

22. Apparatus for enclosing a hollow substrate whose interior is maintained at, or may be subject to, superatmospheric pressure, comprising:
  (a) an inflated, flexible closure member forming a hollow enclosure sealed around at least a portion of the exterior of the substrate, the interior of the enclosure defining a closed chamber, the enclosure having a flexible interior wall proximate to the substrate; and
  (b) a fluid passageway between the interior of the substrate and the closed chamber;
wherein the pressure in the chamber is transmitted to the seal between the closure member and the substrate and urges the closure member towards the substrate in the area of the seal.

23. A method according to claim 22 wherein said substrate comprises a telephone cable.

24. A method according to claim 22 wherein said substrate comprises a splice between two or more telephone cables.

25. An inflatable closure member which comprises
  (a) wall members which are at least in part flexible and which define an inflatable enclosure; and
  (b) sealing material pre-coated on selected flexible portions of said wall members;
the closure member being so constructed and arranged that it can be wrapped around a splice comprising at least two cables and a joint therebetween so that parts of the member overlap and so that there is sealing material between the closure member and the cables and between overlapping parts of the closure member, whereby after surrounding the wrapped closure member with a restraining means, inflation of the closure member causes it to be pressed against the restraining means and against the cables with sealing material therebetween and thus to create a continuous seal between the cables and the closure member.

26. A closure member according to claim 25 which comprises at least two sheets of flexible organic polymeric material which are joined together to form a closed bag comprising a generally planar wall member, whose marginal portions have a coating thereon of a sealing material.

27. A closure member according to claim 26 which comprises a port through which gas can be passed to inflate the bag.

28. A closure member according to claim 27 wherein said marginal portions are at least partly corrugated.

29. A closure member according to claim 30 wherein said sealing material will flow under pressure at room temperature.

30. A closure system which comprises
  (1) an inflatable closure member which comprises
    (a) wall members which are at least in part flexible and which define an inflatable enclosure; and
    (b) sealing material pre-coated on selected flexible portions of said wall members; and
  (2) restraining means
the closure member being so constructed and arranged that it can be wrapped around a splice comprising at least two cables and a joint therebetween so that parts of the member overlap and so that there is sealing material between the closure member and the cables and between overlapping parts of the closure member, whereby after surrounding the wrapped closure member with a restraining means, inflation of the closure member causes it to be pressed against the restraining means and against the cables with sealing material therebetween and thus to create a continuous seal between the cables and the closure member.

31. A closure system according to claim 30 wherein said closure member comprises at least two sheets of flexible organic polymeric material which are joined together to form a closed bag comprising a generally planar wall member whose marginal portions have a coating thereon of a sealing material.

32. A closure system according to claim 31 wherein said closure member comprises a port through which gas can be passed to inflate the bag.

33. A closure system according to claim 32 wherein said marginal portions are at least partly corrugated.

34. A closure system according to claim 32 wherein said sealing material will flow under pressure at room temperature.

35. A closure system according to claim 34 wherein said restraining means comprises a piece of woven cloth which can be wrapped around the wrapped closure member, and longitudinal securing means and marginal diameter reduction means such that the wrapped restraining means can adopt a generally sausage-shaped configuration substantially surrounding the inflatable closure member.

36. An assembly comprising
   (a) a splice comprising at least two cables and a joint therebetween;
   (b) an inflated, at least partially flexible, enclosure around the splice, the enclosure comprising an inner wall and outer wall;
   (c) sealing material coated on selected flexible portions of said inner wall member; and
   (d) restraining means for the enclosure;
whereby parts of the enclosure overlap and there is sealing material between the enclosure and the cables and between overlapping parts of the enclosure, the inflation of the enclosure causing it to be pressed against the cables with sealing material therebetween resulting in a continuous seal between the cables and the enclosure.

37. An assembly according to claim 36 wherein the enclosure comprises at least two sheets of flexible organic polymeric material which are joined together to form a closed bag comprising a generally planar wall member, whose marginal portions have a coating thereon of a sealing material.

38. An assembly according to claim 37 including a port through which gas can be passed to inflate the bag.

39. An assembly according to claim 37 wherein said marginal portions are at least partly corrugated.

* * * * *